United States Patent [19]
Demos

[11] Patent Number: 5,305,324
[45] Date of Patent: Apr. 19, 1994

[54] DATA SCRAMBLING INTERFACE FOR CORRECTING LARGE BURST ERRORS IN HIGH SPEED, HIGH CAPACITY TAPE DRIVES

[75] Inventor: Gary Demos, Culver City, Calif.

[73] Assignee: DemoGraFX, Culver City, Calif.

[21] Appl. No.: 89,426

[22] Filed: Jul. 6, 1993

Related U.S. Application Data

[63] Continuation of Ser. No. 589,383, Sep. 26, 1990, abandoned.

[51] Int. Cl.⁵ .................................................. G06F 11/10
[52] U.S. Cl. ............................. 371/2.1; 360/48; 360/53; 371/2.2; 371/38.1
[58] Field of Search ............... 371/2.1, 2.2, 38.1, 371/39.1; 360/48, 53

[56] References Cited

U.S. PATENT DOCUMENTS

| | | | |
|---|---|---|---|
| 3,449,718 | 6/1969 | Woo | 371/32 |
| 3,652,998 | 3/1972 | Forney, Jr. | 371/2.1 |
| 4,470,142 | 9/1984 | Ive | 371/2.2 |
| 4,488,298 | 12/1984 | Bond et al. | 371/2.2 |
| 4,597,020 | 6/1986 | Wilkinson | 371/2.1 |
| 4,661,955 | 4/1987 | Arlington et al. | 371/13 |
| 4,742,517 | 5/1988 | Takagi et al. | 371/2.2 |
| 4,802,170 | 1/1989 | Trottier | 371/2.2 |
| 4,817,035 | 3/1989 | Timsit | 371/10.1 |
| 4,849,929 | 7/1989 | Timsit | 364/900 |

OTHER PUBLICATIONS

Lapin, The Probelm of Automatic Correction of Grouped Errors on Magnetic Tape, Probl. Inf. Transm., vol. 4, No. 1, Spring 1968, pp. 22-26.

Primary Examiner—Charles E. Atkinson
Attorney, Agent, or Firm—Spensley Horn Jubas & Lubitz

[57] ABSTRACT

An error correction and detection interface between a high speed data channel and a high capacity digital data recording tape system includes a data scrambling and translation scheme which provides an additional layer of error correction to the data as it is recorded. The data scrambling and translation scheme permits the correction of normally uncorrectable large error bursts on digital tape devices.

47 Claims, 6 Drawing Sheets

DATA SCRAMBLING INTERFACE FOR CORRECTING LARGE BURST ERRORS IN HIGH SPEED, HIGH CAPACITY TAPE DRIVES

This is a continuation of application Ser. No. 07/589,383, filed on Sep. 26, 1990, now abandoned.

BACKGROUND OF THE INVENTION

1. Field of the Invention

This invention is directed to an error detection and correction interface between a high speed data channel and a high capacity, high transfer rate digital data recording tape system.

2. Related Art

Error detection and correction is a significant problem in the area of high capacity, high transfer rate data recording systems, such as in an ID-1 unit of the type manufactured by Datatape Corporation (a subsidiary of Kodak), using a helical scan tape format. Errors can arise from magnetic-tape dropouts, electronic noise, dirt particles located between the head and tape, creases in the tape, oxide flaking, longitudinal scratches, oxide manufacturing flaws, faulty read/write electronics, etc. The present invention is directed to the correction of large error bursts, or dropouts, as well as smaller randomly occurring data errors. Both types of errors occur in helical scan magnetic tape formats, such as an ID-1 system. The teachings of the present invention are, however, also applicable to longitudinal tape formats.

Using various types of error detection and correction methods, wideband digital data can be reproduced from a digital recording system, such as an ID-1 system, with a bit error rate (BER) of less than one (1) in $10^{10}$ bits when averaged over $7.9 \times 10^{11}$ bits, with the following restriction: according to the ANSI subcommittee that defined this standard, such a performance can be achieved excluding up to one error burst greater than 3k bytes per tape. Also, according to this subcommittee, one of ten tapes could have two or more such bursts, which would result in a BER significantly worse than one (1) in $10^{10}$ bits.

A typical prior art error correction system can be seen in U.S. Pat. No. 4,238,852 assigned to Sony Corporation. This system uses a linear, rather than a helical scan tape format, and optimizes the separation of the bits in only one dimension. Moreover, the separation between bits is not sufficient to overcome larger dropout errors.

The present invention overcomes the limitations of such conventional tape drive data correction systems by way of a data translation method which rearranges the data on the recording tape in two dimensions, such that large error bursts, while they may destroy physically contiguous data groups, will not destroy logically contiguous data groups. Basically, the fundamental principle of the present invention is to separate as much as possible each bit of data composing a unique encoded data word correction group. The invention separates and physically spaces each bit both vertically and horizontally on the tape from its nearest logical bit neighbor. The present invention thus provides an additional layer of correction in addition to the correction system present already in high capacity tape drive systems. It is estimated that the present invention can correct error bursts of as much as 32k bytes every 100 megabytes.

Because of the increased reliability added by the present invention, it is expected to have wide use and application in many data processing applications requiring high transfer rates, high data density and high data integrity. Such applications include tape systems for large scale supercomputing facilities, digitally compressed HDTV, and high resolution computer display of data.

SUMMARY OF THE INVENTION

The present invention discloses an error correction and detection interface between a high speed data channel and a high capacity digital recording tape system. The interface includes specific circuits for Error Detection and Correction (EDAC), a double-buffered series of large single-bit memories (in this case, Static Random Access Memories (SRAMs)), a double-buffered serializer First-In First-Out (FIFO) register, a checksummer, and assorted control multiplexers, latches, drivers, and programmable logic arrays. The system architecture accommodates a high speed tape drive. It will be apparent to the skilled artisan that additional tape drive units may be added, operating either individually or in parallel.

In operation, as data is read in from a high speed channel, it is grouped into data blocks of a predetermined length. A correction code is added, resulting in a slightly longer encoded data block length. These longer encoded data blocks are sent via a memory bus and stored in large one-bit SRAMS. The data in the SRAMS is read out and transferred to a tape drive in a scrambled fashion such that no one bit from any particular encoded data block is recorded near any other bit on the physical tape. In this way, if the tape has a large burst error, such that a large number of bad bits will be returned from the tape unit as a group, these bits will represent only single bits in a plurality of original encoded data blocks. Such single-bit errors are relatively simple to correct. In order to have an uncorrectable error, at least two simultaneous burst errors at precisely the location of a pair of adjacent bits of the scrambled data words would have to occur. This is highly unlikely because of the random placement and wide separation (greater than three tracks) between bit pairs. As the data is written to the tape, it is also checksummed, stored and later compared when the tape drive unit performs a read-after-write operation. In this manner, data errors during writing can be detected by the interface and re-written correctly to the tape. The present invention augments the overall error correction capability of the system in a manner transparent to both the data channel (except for a small reduction in bandwidth) and the digital tape drive.

DETAILED DESCRIPTION OF THE INVENTION

As mentioned above, the specifications for some high capacity tape drive systems indicate that errors can be corrected to a frequency of one error for each $10^{10}$ good bits (as in ID-1). This is accomplished through multiple layers of correction codes usually contained within the tape drive units. However, these correction codes are not adequate to compensate for occasional large tape error drop-outs on the order of 3k bytes or more. Also a $10^{10}$ error correction capability is not sufficient for many large scale computing applications.

Figure 3:
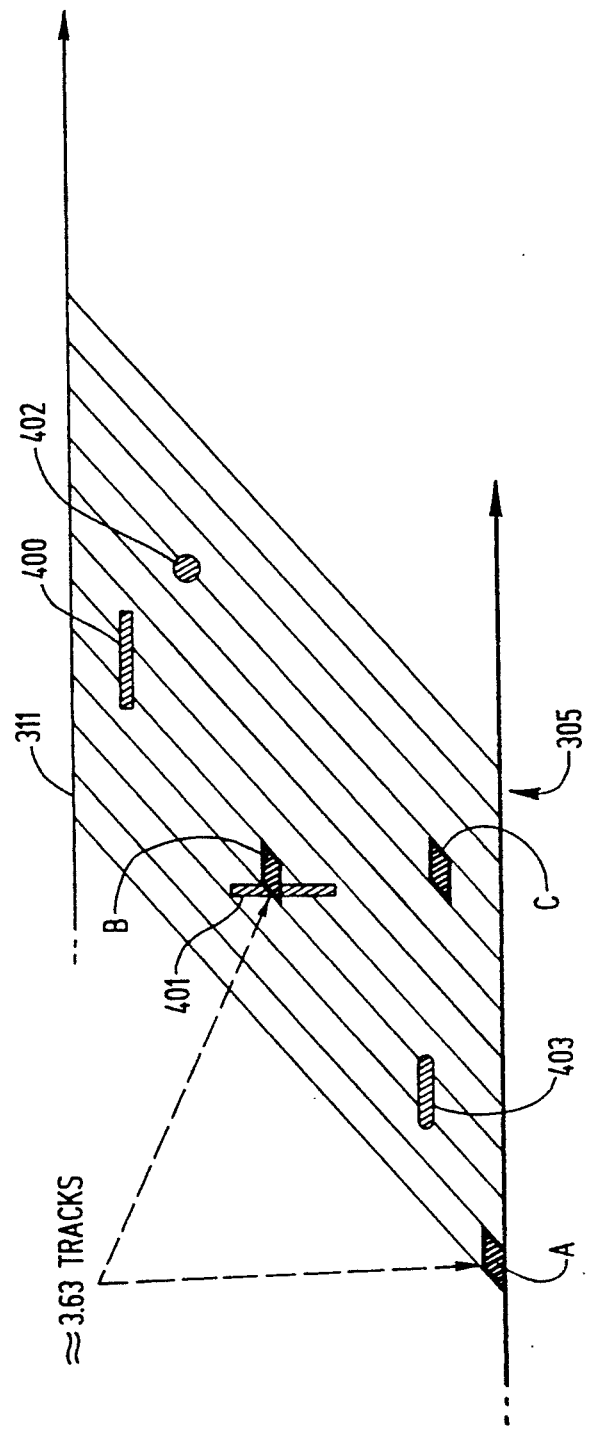
FIG. 3 is a schematic drawing of the physical layout of a conventional helical digital magnetic tape format, showing an example of the technique employed by the present invention to correct large error bursts as well as single bit errors.

In FIG. 3, a physical representation of the data as recorded on a typical digital tape 305 is shown. (The tape is shown in a slightly distorted perspective for ease of explanation and clarity; the tracks are actually at much smaller angles). Each track 311 in a typical tape used in an ID-1 unit contains 36,108 bytes (differing track sizes can obviously be accommodated). A series of different types of error-burst or drop-outs 400-404 are shown, each of which is physically larger than would be correctable with typical error-correcting techniques. These drop-outs differ in size, shape, direction, etc., and overlap several separate tracks. Such drop-outs may be caused by a defect in the tape, or the presence of some foreign material forced transversely across the tape, damaging it in the manner shown. Using the method of the present system, any two logically contiguous bits of a data word are preferably spread 128K apart. This translates into 131072 bytes (128k) divided by 36108 bytes per track, or 3.63 tracks apart, in an ID-1 system. Depending on the tape format and system used, the separation can easily be varied.

As can be seen in FIG. 3, three logically contiguous bits A, B and C of a data word encoded with the present invention are shown as they would be recorded on the tape. Drop-out 401 has destroyed several tracks of the tape, including bit B, but does not affect logically adjacent bits A and C of the data word. The fractional track difference also means that the next logical bit will not lie directly in line (with respect to tape motion) latitudinal with the previous logical bit, but rather, will be offset vertically within the data track. This additional offset in effect further enhances the randomness of the placement of the data, preventing common linear drop-outs of the type shown from destroying many bits of any single data word. In this way, if the tape 305 has a large burst error 401, even though a large number of bad bits will be returned from the tape unit as a group, these bits normally will only be a single bit in the encoded data word. In order to have an uncorrectable error, two or more simultaneous burst errors at specific points on the tape would have to occur (such as at A and B), which is statistically much less probable, and probably indicates a bad tape or tape transport.

Figure 1:
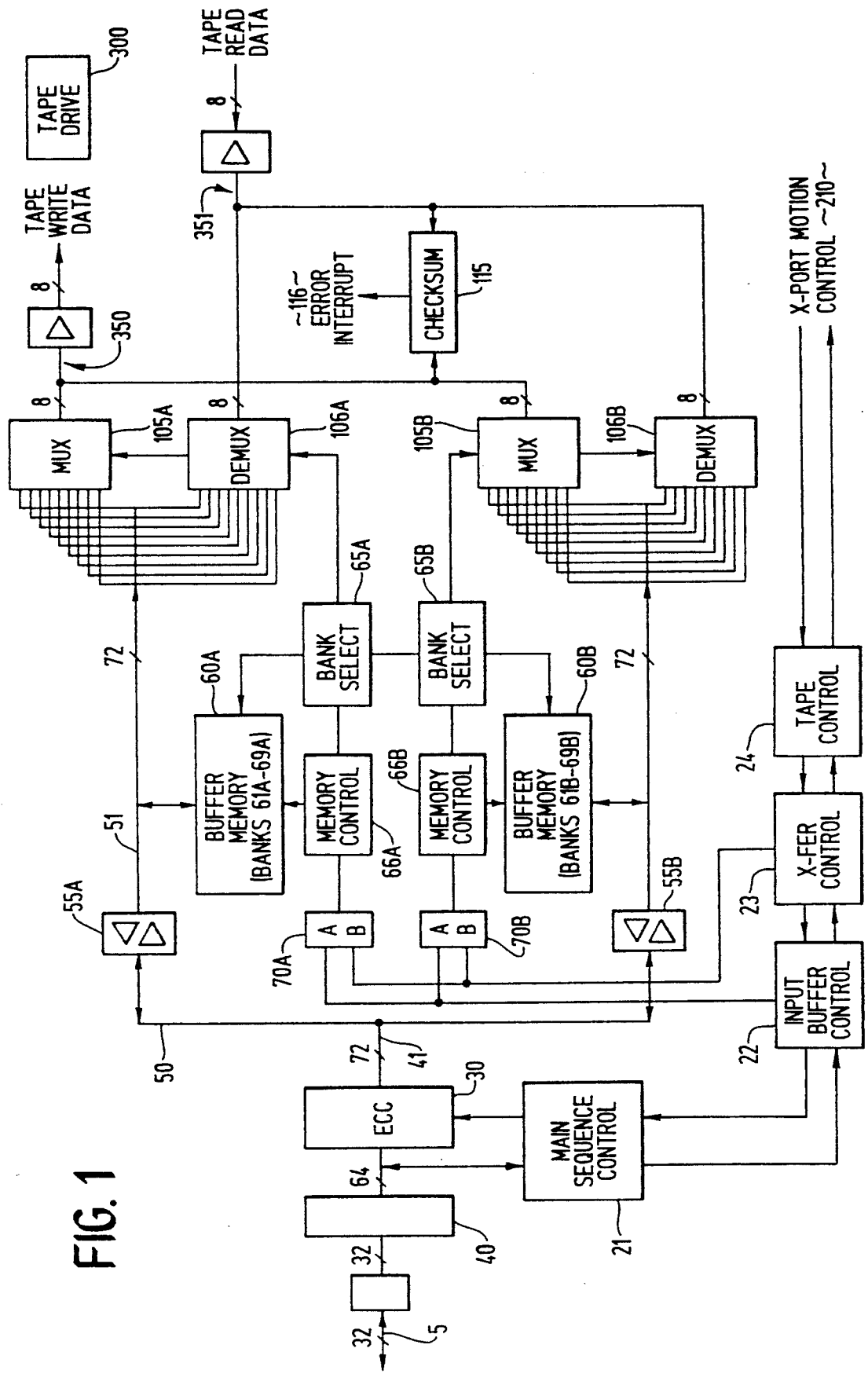
FIG. 1 is a block diagram of the interface of the present invention, as such would be used in connection with a high-speed tape drive.

Referring to FIG. 1, the input side of the present device is connected to a data channel 5. In a preferred embodiment, data channel 5 is a High Performance Peripheral Interface (HIPPI) channel, which operates at speeds up to 100 MBytes/second for a 32-bit channel width words, and 200 Mbytes/second for 64-bit words channel width words, and which may be connected to a host supercomputer or other high speed data processing system. On the output end of the device, data is written to and read from a high capacity digital tape drive 300 via data buses 350 and 351, which operate at speeds up to 50 Mbytes/second. As mentioned earlier, digital tape drive 300 is preferably an ID-1 unit whose transport is typically controlled over a well-known standard IEEE 488 bus 210.

From left to right, 32-bit data words are preferably grouped into 64-bit words from the high speed channel bus 5 by an Error Detection and Correction (EDAC) circuit 30 under control of input sequencer 21. An 8-bit error correction code (ECC) is added to the data word by the EDAC 30, resulting in a 72-bit encoded word. Data groupings other than 64 bits or correction code lengths other than 8 bits can also be used.

Figure 2:
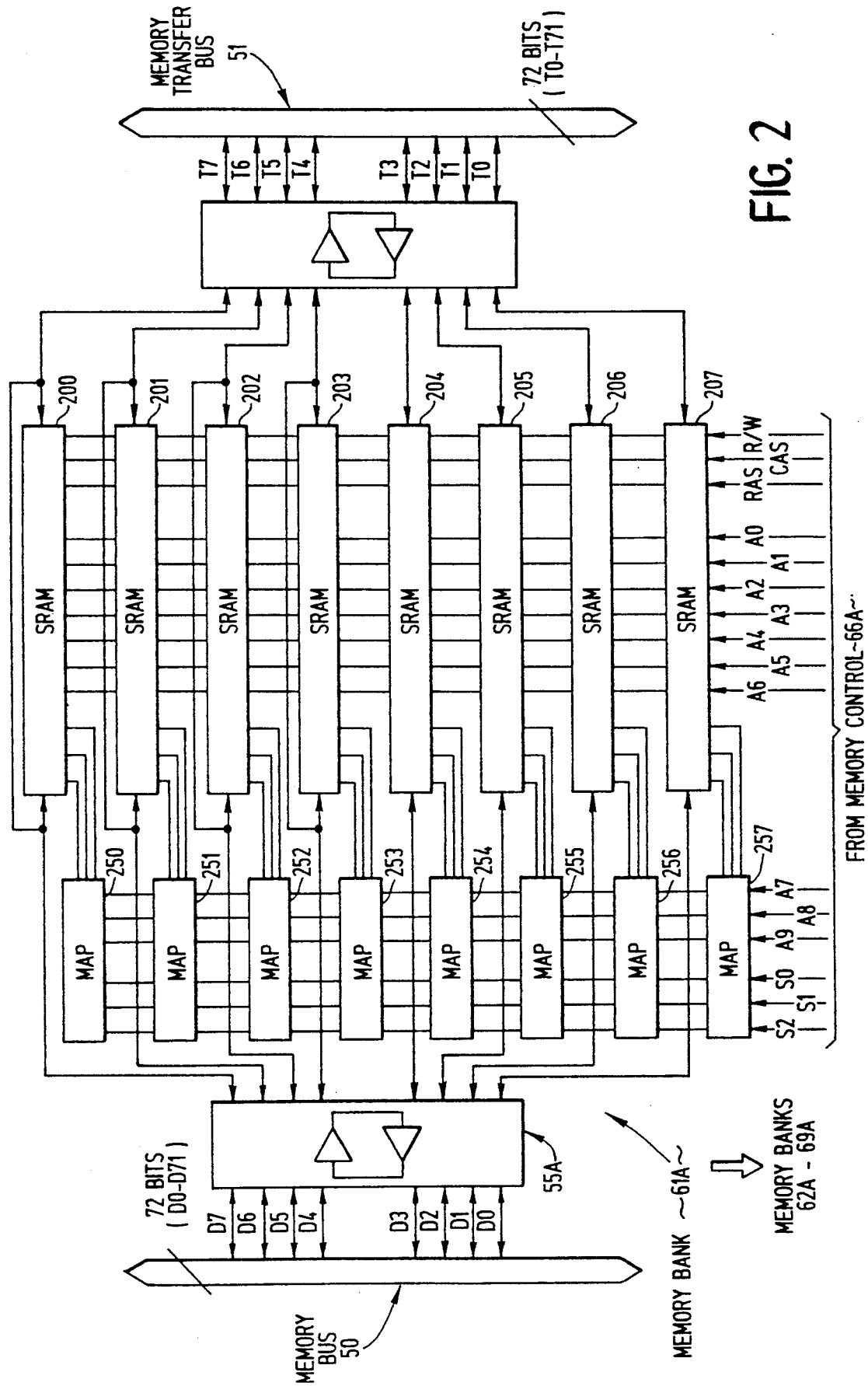
FIG. 2 is a more detailed block diagram of the buffer memory, memory bus and the memory controller.

The encoded word is passed by means of memory bus 50 and bidirectional drivers 55A (or 55B) to buffer memory 60A (or 60B). Buffer memory 60A (or 60B), comprised of memory banks 61A-69A (or memory banks 61B-69B for buffer memory 60B), is selected and enabled to write data from memory bus 50 by multiplexer 70A (or 70B for buffer memory 60B) under control of input buffer control circuit 22. The structure and operation of such memory control circuits, buffer control circuits and multiplexers is well-known in the art. The encoded 72-bit word is then split up into data segments one bit in length and serially placed into 72 separate one megabit by 1-bit SRAMs 200-207, in the preferred embodiment (other sized SRAMs could also be used; also, for example, an embodiment using DRAMs is explained below). These 72 separate SRAMS are divided up into nine banks of one megabyte (eight megabits) each; a typical bank 61A is shown in FIG. 2. It will be apparent also to those skilled in the art that other bank configurations using different numbers of SRAMs could be used depending on the characteristics of the tape drive system, the data bus employed, and the availability of larger SRAMS.

In FIG. 2, bank 61A comprised of one megabit SRAMs 200-207 is shown, with accompanying address decoders 250-257. A series of bidirectional drivers 55A direct eight (D0-D7) of the 72 bits of the 72-bit encoded data word to SRAMS 200-207. An additional eight banks, 62A-69A, albeit not shown, are identical to bank 61A; bank 61A is selected by means of bank select circuit 65A. Within 8-bit bank 61A, the high order three bits of the data addresses (A19-A17) are spread to equal spacing by a simple lookup adder in memory maps 250-257. Memory maps 250-257 select the memory addresses such that the memory control device 66A counts the addresses down with maps 250-257 adding and spreading when writing the memories 200-207, and counts the addresses up with naps 250-257 passing the address when reading the memories.

In this manner, each bit within each group of eight bits of the encoded 72-bit word is spread across the 8 SRAMs within each 8-bit bank in different logical locations, separated by a memory space of 128K, or ⅛th of the one megabit address space, in the preferred embodiment.

Thus, as a result of the addresses being scrambled during writes to the SRAMs 200-207, the 1 MByte of memory in bank 61A is effectively partitioned into eight regions of 128k bytes each. The same separation occurs in the other eight banks, ensuring the same 128K separation between the other 64 (72−8) bits from the encoded data word. As the buffer memory 60A is loaded with new data, a one Mbyte set of new encoded data words within bank 61A are thus formed from the scrambled original encoded data words. When written on the tape, these new encoded data words from buffer memory 60A include eight bits from the encoded 72-bit word separated logically (and physically on the tape) by 128k bytes. This 128K separation between bits of the encoded data word on the tape ensures that a large dropout or error burst of the order described earlier will not make an original 72-bit encoded data word unrecoverable.

Once the 8 MBytes of data and 1 MByte of correction codes of the nine banks is full (i.e., 1 MByte per bank), the memory bus 50 is connected by Input Buffer Controller 22 to the second buffer memory 60B, as is usually done in double-buffering. The structure and operation of Buffer memory 60B is identical to that of buffer memory 60A. For example, there are an additional nine 1 Mbyte memory banks in Buffer memory 60B.

As buffer memory 60B is loaded with new data, the full nine Mbytes of buffer 60A are then written out to bus 51 eight bits at a time (T0–T7), and to the tape device 300. During writing, bank select circuit 65A writes the nine banks (61A–69A) separately and sequentially, one bank at a time, under control of X-fer (transfer) Buffer Control 23. Control 24 coordinates the starting and stopping of the tape transport.

Each bank represents a byte-wide channel that is written to tape 300. The high three address bits are "locked" together as the normal address, with an up-counting address. In this way, the bits are presented to the tape 300 with no two bits from the original 72-bit word being near each other.

The data is retrieved from buffer memory 60A and written to tape 300 in the following manner. First, memory bus 51 connects memory buffer 60A to mux 105A. Mux 105A, comprised of a nine-input mux, is followed by a FIFO. The 8-bit FIFO accommodates the different operating speed of the tape drive bus. The data passes from mux 105A to single-byte wide bus 350 where it is written to tape 300 and also acted upon by checksumming circuit 115. Checksumming circuit 115 includes a series of FIFO registers for computing a sum and an XOR of the track data as it is written to the tape 300. The depth of the FIFO registers in the checksumming circuit 115 is determined in accordance with the read-after-write latency period of the tape drive system.

As an additional measure to enhance the reliability of the data storage system, a checksum may be computed from the data while it is being written to the tape. The data can then be read back from the tape, and a second checksum can be calculated and compared with the first ("read after write" operation). If there is an error, the host can be informed and the data can be re-written under the command of the host, or by the device alone. In the latter case, before re-writing any bad data, the present device will wait until the entire contents of a bank of memory 60A (one of 61A–69A) is written to the tape; this typically translates into a latency period of approximately 29 tracks (1 Mbyte of data/36108 kbytes per track). The bad track may then be re-written from one of banks 61A through 69A as appropriate. After the latency and re-write periods, the present device can then switch from buffer memory 60A to buffer memory 60B.

The previously described checksumming function is accomplished in the following manner: in the output stage of the present device, and specifically, bus channel 350, the data is simultaneously written to tape 300 and sent to checksumming circuit 115. Checksummer 115 calculates a checksum from the outgoing data, and then compares this against the value calculated from data read through bus channel 351 during a later read-after-write operation. Checksummer 115 computes a 24-bit sum for each track 311 of data on the tape as it is recorded. As mentioned earlier, each track is 36108 bytes in the illustrated embodiment. The sum computed is stored in a 24-bit register. An 8-bit XOR of the 36,108 bytes going to tape 300 is also generated. The 24-bit track sum and 8-bit XOR data checks are contained in a 32-bit register. This register is placed into a FIFO, which is of sufficient depth to allow for the distance and time between the write and read heads on the tape 300, as well as the tape unit's internal buffering and data reconstruction; for example, in the ID-1 unit, this corresponds to about 29 tracks. When the read-channel 351 provides the verification data coming back, a second 24-bit sum and second 8-bit XOR are computed. These are then compared with the first values stored in the checksummer FIFO. If there is a difference, an error interrupt 116 is generated to the host. The two sets of 32-bit check values can be made available to the host, so that the host can determine both the approximate number of bad bits as well as the approximate distribution of error bits within the 8-bit byte.

When an error is flagged, the host can take appropriate action to re-record the bad data onto another portion of the tape. This usually takes the form of a rewrite of single bad track, although transfer rates as seen from the host are degraded if error re-writes occur. The transfer rate may also decrease if the next set data in the 9 Mbyte buffers 60B is held until the latest data in the 9 Mbytes of buffer 60A is checked.

During read operations, data passes back through demux 106A, and is routed by driver 55A on bus 51 to buffer memory 60A. At this stage, the data has been read off the tape in the scrambled form it was written, and it must now be unscrambled. As the bits separated by 128K from the incoming 72-bit word are now written logically adjacent in memories 200–207, the original 72-bit words are reconstructed. The reconstructed 72-bit words are passed to memory bus 50 by driver 55A, where the ECC bits are stripped and decoded by EDAC 30 to detect and correct errors in the 64-bit original data. The corrected 64-bit data can then be read by the host bus 5.

Figure 4A:
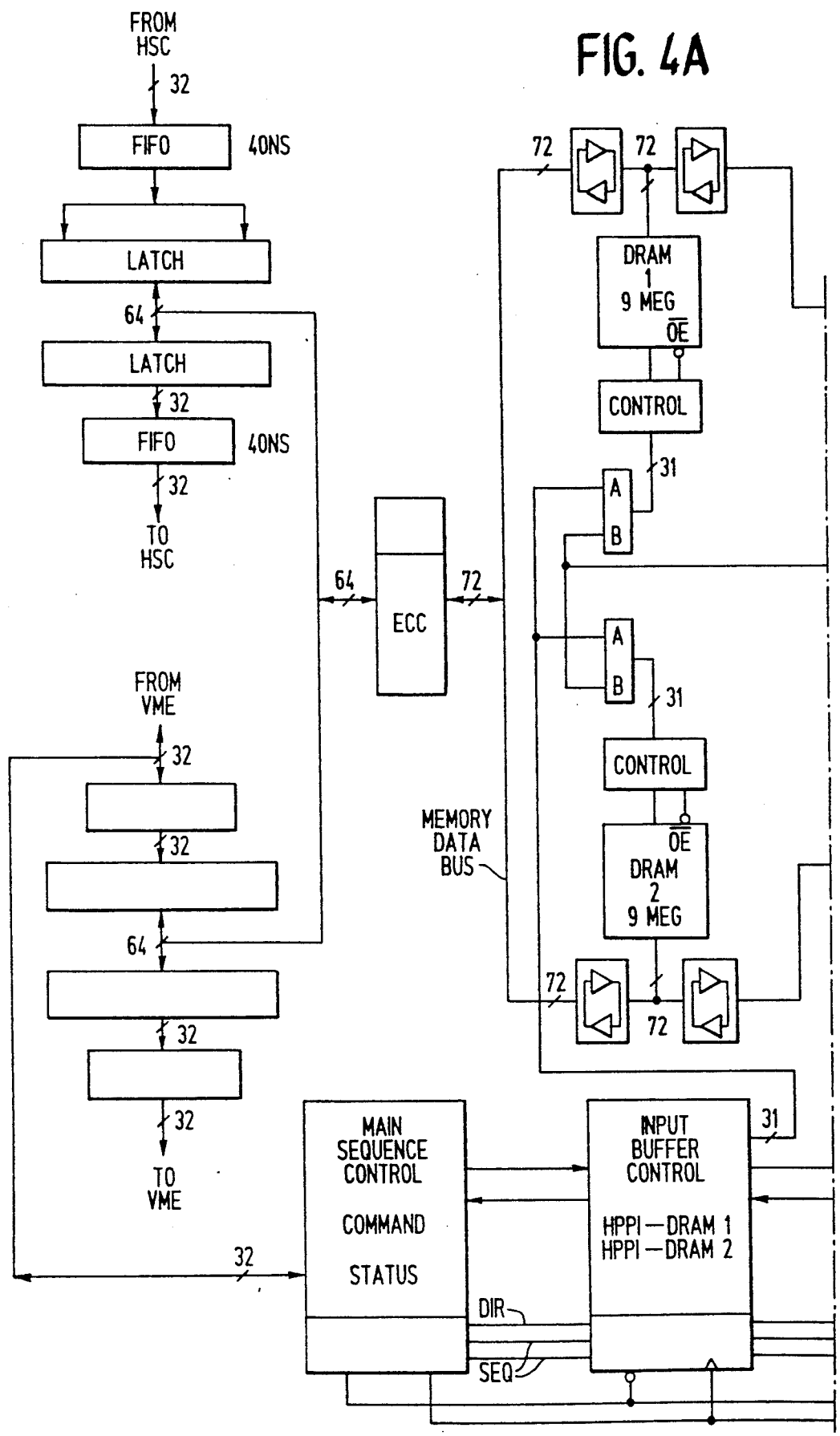
FIG. 4, composed of FIGS. 4A–4C, is a block diagram of an alternate embodiment of the present system, using a different form of buffer memory storage.
Figure 4B:
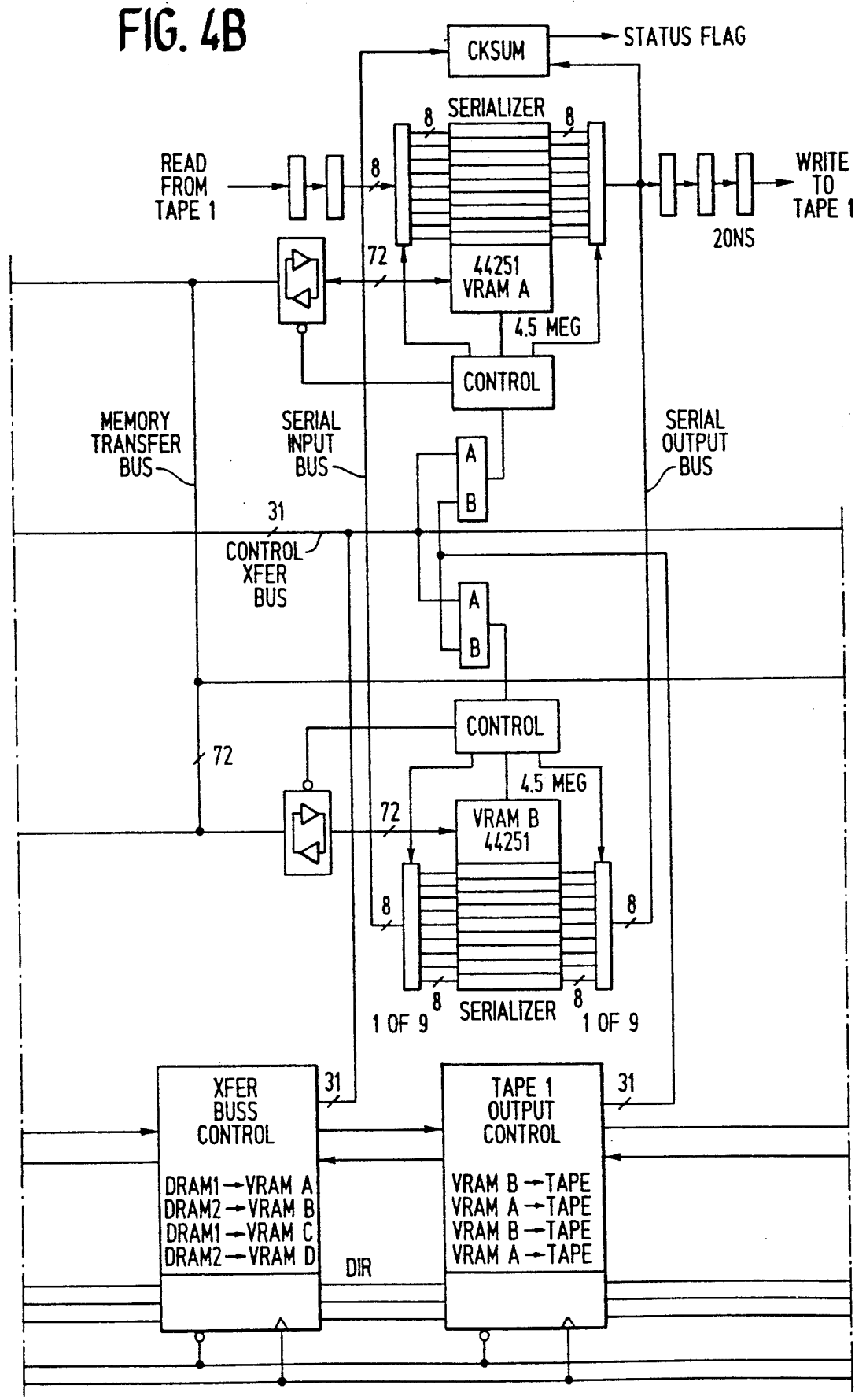
Figure 4C:
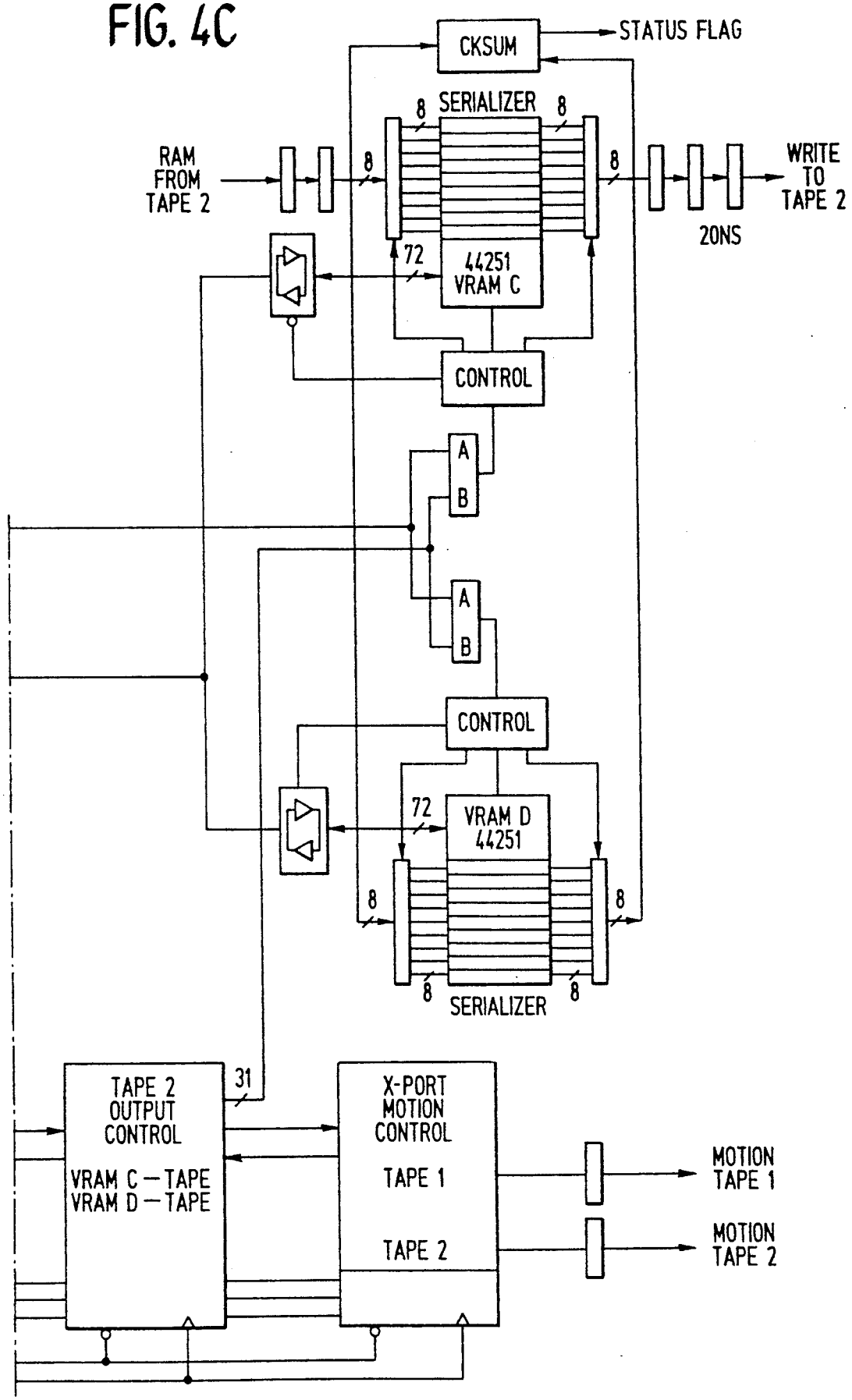

It is apparent from the disclosure of the present invention that other buffer memory arrangements and bit translation schemes may be employed to effectuate the same results as the preferred embodiment described above. For example, in FIG. 4, the SRAMs of the preferred embodiment may be replaced with DRAMs used in conjunction with Video RAMs (VRAMS), where the VRAMs are used to achieve the required higher transfer rates. In order to use DRAMS, or slower SRAMs in a high speed interface, an identical organization of 9 banks of 8 bits each of 1MBits×1 DRAMs is used., However, at present it is generally not possible to read or write to commercially available DRANs at a rate equivalent to SRANs to achieve transfer rates required by some embodiments of the ID-1.

In order to write the byte-wide stream to a high speed data channel, and in particular, the ID-1 tape channel, a conversion from a typical 160 ns DRAM to the fastest 20 ns channel rate of an ID-1 must be performed. In order to perform this rate increase, a buffer of Video RAMs may be used. These VRAMS are interleaved, since their maximum speeds do not reach 20 ns typically. Running in pairs at 40 ns, VRAMS can easily write the tape channel at the required 20 ns speed. Typical VRAMS are one MBit chips organized as typical 256k×4. Sets of four such VRAMs receive the eight bits of a bank in even/odd word pairs, to load the dynamic RAM portion of the VRAM. The nine banks then require 4 chips/bank×9 banks=36 chips, for a total of nine MBytes for the VRAM portion of the memory. This memory is also doubled buffered, resulting in a total of eighteen MBytes of VRAM. The VRAMs thus function as speed accelerators to achieve the fastest read/write time (20 ns) required by the ID-1 tape channel.

It is equally apparent that the encoded data words may be smaller or larger than 72 bits, and that the separation between adjacent data segments of any such encoded data words may be smaller or larger than the 128K chosen in the preferred embodiment, depending on the format of the tape, the track structure thereon, and the desired random placement on the tape. Moreover, the data words may be broken up into segments of arbitrary length greater than 1-bit each. Therefore, the scope of the invention is to be determined by the following claims.

What is claimed is:

1. A high speed data interface for recording information onto a tape comprising:
    data receiver means for receiving original data words from a high speed data channel;
    a buffer memory, coupled to the data receiver, and having a plurality of memory locations;
    memory control means, coupled to the buffer memory, for separating each original data word into smaller data segments, and writing said smaller data segments to equally spaced locations in the buffer memory to generate buffer memory data words;
    recording means, coupled to the buffer memory and to the tape, for recording the buffer memory data words from the buffer memory onto the tape such that each data segment of each original data word is located on the tape spaced both longitudinally and vertically from every other data segment from the same original data word.

2. The device of claim 1, wherein the data receiver means includes error detection and correction means for generating and appending an error detection and correction code to the original data words received from the high speed data channel.

3. The device of claim 2, wherein the data channel is an HIPPI data bus, and the error detection and correction means append and 8-bit correction code to the received original data words.

4. The device of claim 3, wherein the buffer memory comprises 72 separate random access memories.

5. The device of claim 4, wherein the buffer memory data words are created by dividing the original data words into individual data segments of one bit each and separating said data segments by 128 Kbytes in the buffer memory.

6. The device of claim 1, wherein the recording means further includes reading means for reading the buffer memory data words from the tape, and whereby the memory control means operates to re-create the original data words, and the error detection and correction means detects and corrects errors in the original data words.

7. The device of claim 1, further including checksumming means for calculating a first checksum value from the buffer memory data words as they are recorded onto the tape, for calculating a second checksum value from the data read back from the tape, and for generating an error message if the two checksum values differ.

8. The device of claim 1, wherein the recording means records buffer memory data words onto the tape in diagonal tracks.

9. The device of claim 8, wherein the data segments of each original data word are recorded onto the tape spaced by more than one diagonal track.

10. The device of claim 8, wherein the data segments of each original data word are recorded onto the tape spaced by a mixed number of diagonal tracks, where the mixed number is greater than one.

11. A high speed data interface for recording information onto a tape comprising:
    a data receiver connected to a high speed data channel for receiving original data words;
    a buffer memory, coupled to the data receiver, and having a plurality of memory locations;
    a memory control circuit, coupled to the buffer memory, for separating each original data word into smaller data segments and writing said smaller data segments to equally spaced locations in the buffer memory to generate buffer memory data words;
    a bus interface, coupled to the buffer memory and to the tape, for recording the buffer memory data words onto the tape, such that each data segment of each original data word is located on the tape spaced both longitudinally and vertically from every other data segment from the same original data word.

12. The device of claim 11, wherein the data receiver also includes an error detection and correction code circuit for generating and appending an error correcting code to the original data words.

13. The device of claim 12, wherein the data channel is a HIPPI data bus, and the error detection and correction code circuit generates and appends an 8-bit code to the original data words.

14. The device of claim 13, wherein the buffer memory data words are created by dividing the received original data words into individual data segments of one bit each and separating said data segments by 128 Kbytes in the buffer memory.

15. The device of claim 14, wherein the buffer memory comprises 72 separate random access memories.

16. The device of claim 11, further including a checksumming circuit for calculating a first checksum value from the buffer memory data words as they are recorded onto the tape, for calculating a second checksum value from the data read back from the tape, and for generating an error message if the two checksum values differ.

17. The device of claim 11, including a tape interface for reading data from the tape, and whereby the memory control circuit operates to re-create the original data words from the buffer memory data words, and the error detection and correction means detects and corrects any errors in the original data words.

18. The device of claim 11, wherein the bus interface records buffer memory data words onto the tap in diagonal tracks.

19. The device of claim 18, wherein the data segments of each original data word are recorded onto the tape spaced by more than one diagonal track.

20. The device of claim 18, wherein the data segments of each original data word are recorded onto the tape spaced by a mixed number of diagonal tracks, where the mixed number is greater than one.

21. In a high speed data interface, a method of recording information onto a multi-track tape having a length and a width, comprising the steps of:
- receiving and separating original data words into smaller data segments;
- writing the smaller data segments of each original data word to equally locations in a buffer memory to generate buffer memory data word;
- recording the buffer memory data words onto the tape such that each data segment of each original data word is located on the tape spaced both longitudinally and vertically from every other data segment from the same original data word.

22. The method of claim 21, wherein an error correcting code is generated and appended to the original data words.

23. The method of claim 22, wherein the error correcting code is 8 bits in length.

24. The device of claim 21, wherein the buffer memory data words are created by dividing the original data words into individual data segments of one bit each and separating said data segments by 128 Kbytes in the buffer memory.

25. The method of claim 21, including the steps of calculating a first checksum value from the buffer memory data words as they are recorded on the tape, calculating a second checksum value from the data words as they are read back from the tape, and generating an error message if the two checksum values differ.

26. The method of claim 21, including the steps of reading the data from the tape, re-creating the original data words, and detecting and correcting any errors present in said original data words.

27. The device of claim 21, further including the step of recording buffer memory data words onto the tape in diagonal tracks.

28. The device of claim 27, wherein the data segments of each original data word are recorded onto the tape spaced by more than one diagonal track.

29. The device of claim 27, wherein the data segments of each original data word are recorded onto the tape spaced by a mixed number of diagonal tracks, where the mixed number is greater than one.

30. A high speed data interface for recording information onto a tape in diagonal tracks, comprising:
- data receiver mans for receiving original data words from a high speed data channel;
- a buffer memory, coupled to the data receiver, and having a plurality of memory locations;
- memory control means, coupled to the buffer memory, for separating each original data word into smaller data segments, and writing said smaller data segments to equally spaced locations in the buffer memory to generate buffer memory data words;
- recording means, coupled to the buffer memory and to the tape, for recording the buffer memory data words from the buffer memory onto the tape in a plurality of diagonal tracks, such that each data segment of each original data word is located on the tape spaced from every other data segment from the same original data word by at least one such diagonal track.

31. The device of claim 30, wherein the data segments of each original data word are recorded onto the tape spaced by an integer number of diagonal tracks, where the integer number is greater than one.

32. The device of claim 30, wherein the data segments of each original data word are recorded onto the tape spaced by a mixed number of diagonal tracks, where the mixed number is greater than one.

33. The device of claim 30, wherein the data receiver means includes error detection and correction means for generating and appending an error detection and correction code to the original data words received from the high speed data channel.

34. The device of claim 30, wherein the recording means further includes reading means for reading the buffer memory data words from the tape, and whereby the memory control means operates to re-create the original data words, and the error detection and correction means detects and corrects errors in the original data words.

35. The device of claim 30, further including checksumming means for calculating a first checksum value from the buffer memory data words as they are recorded onto the tape, for calculating a second checksum value from the data read back from the tape, and for generating an error message if the two checksum values differ.

36. A high speed data interface for recording information onto a tape comprising:
- a data receiver connected to a high speed data channel for receiving original data words;
- a buffer memory, coupled to the data receiver, and having a plurality of memory locations;
- a memory control circuit, coupled to the buffer memory, for separating each original data word into smaller data segments and writing said smaller data segments to equally spaced locations in the buffer memory to generate buffer memory data words;
- a bus interface, coupled to the buffer memory and to the tape, for recording the buffer memory data words onto the tape in a plurality of diagonal tracks, such that each data segment of each original data word is located on the tape spaced from every other data segment from the same original data word by at least one such diagonal track.

37. The device of claim 36, wherein the data segments of each original data word are recorded onto the tape spaced by an integer number of diagonal tracks, where the integer number is greater than one.

38. The device of claim 36, wherein the data segments of each original data word are recorded onto the tape spaced by a mixed number of diagonal tracks, where the mixed number is greater than one.

39. The device of claim 36, wherein the data receiver also includes an error detection and correction code circuit for generating and appending an error correcting code to the original data words.

40. The device of claim 36, further including a checksumming circuit for calculating a first checksum value from the buffer memory data words as they are recorded onto the tape, for calculating a second checksum value from the data read back from the tape, and for generating an error message if the two checksum values differ.

41. The device of claim 36, including a tape interface for reading data from the tape, and whereby the memory control circuit operates to re-create the original data words from the buffer memory data words, and the error detection and correction means detects and corrects any errors in the original data words.

42. In a high speed data interface, a method of recording information in diagonal tracks onto a tape, comprising the steps of:

receiving and separating original data words into smaller data segments;

writing the smaller data segments of each original data word to equally spaced locations in a buffer memory to generate buffer memory data words;

recording the buffer memory data words from the buffer memory onto the tape in a plurality of diagonal tracks, such that each data segment of each original data word is located on the tape spaced from every other data segment from the same original data word by at least one such diagonal track.

43. The device of claim 42, wherein the data segments of each original data word are recorded onto the tape spaced by an integer number of diagonal tracks, where the integer number is greater than one.

44. The device of claim 42, wherein the data segments of each original data word are recorded onto the tape spaced by a mixed number of diagonal tracks, where the mixed number is greater than one.

45. The method of claim 42, wherein tan error correcting code is generated and appended to the original data words.

46. The method of claim 42, including the steps of calculating a first checksum value from the buffer memory data words as they are recorded on the tape, calculating a second checksum value from the data words as they are read back from the tape, and generating an error message if the two checksum values differ.

47. The method of claim 42, including the steps of reading the data from the tape, re-creating the original data words, and detecting and correcting any errors present in said original data words.

* * * * *